United States Patent [19]

Horton

[11] Patent Number: 4,619,744

[45] Date of Patent: Oct. 28, 1986

[54] RECOVERY OF HEAVY METALS FROM AQUEOUS SOLUTIONS

[75] Inventor: Robert L. Horton, Tulsa, Okla.

[73] Assignee: Phillips Petroleum Company, Bartlesville, Okla.

[21] Appl. No.: 791,883

[22] Filed: Oct. 28, 1985

[51] Int. Cl.⁴ .................. C25C 1/00; B01D 15/06; B01D 11/04

[52] U.S. Cl. .................. 204/105 R; 75/101 BE; 423/24; 423/55; 423/101; 423/139; 423/DIG. 14

[58] Field of Search ............... 75/101 BE; 423/24, 55, 423/101, 139, DIG. 14; 204/105 R

[56] References Cited

U.S. PATENT DOCUMENTS

| | | | |
|---|---|---|---|
| 2,162,936 | 6/1939 | Burrell | 75/101 BE |
| 2,181,890 | 12/1939 | Harris | 75/101 BE |
| 3,473,921 | 10/1969 | Schmuckler | 75/18 |
| 3,635,697 | 1/1972 | Scheiner et al. | 75/101 |
| 3,637,711 | 1/1972 | Budde et al. | 423/DIG. 14 |
| 3,920,545 | 11/1975 | Argabright et al. | 210/30 |
| 4,031,038 | 6/1977 | Grinstead et al. | 75/101 BE |
| 4,085,261 | 4/1978 | Patchornik et al. | 423/139 |
| 4,128,462 | 12/1978 | Ghiringhelli et al. | 204/109 |
| 4,139,432 | 2/1979 | Ghiringhelli et al. | 204/110 |
| 4,139,502 | 2/1979 | Halmann et al. | 423/139 |
| 4,292,280 | 9/1981 | Van Enelenburg et al. | 423/DIG. 14 |
| 4,317,887 | 3/1982 | Warshawsky et al. | 75/101 BE |
| 4,401,629 | 8/1983 | Hancock et al. | 423/24 |
| 4,406,865 | 9/1983 | Fuller | 423/24 |
| 4,500,494 | 2/1985 | Scher | 423/DIG. 14 |

OTHER PUBLICATIONS

Bowen, J. Chem. Soc. (A) 1970, pp. 1082–1085.
Chemical Geology 33, 163–169 (1981) SRI Final Report on "Recovery of Heavy Metals from High Salinity Geothermal Brine".

*Primary Examiner*—Arthur P. Demers
*Attorney, Agent, or Firm*—Stephen E. Reiter

[57] ABSTRACT

Process for the recovery of heavy metals from aqueous solution by reaction with soluble, functionally-substituted polymer upon which the heavy metal loads, and optionally crosslinks by interaction with the heavy metals present in solution. Metals including those having atomic numbers of 39-51, 57-84 and 89-117, inclusive, can be recovered by the practice of the present invention.

12 Claims, No Drawings

RECOVERY OF HEAVY METALS FROM AQUEOUS SOLUTIONS

This invention relates to the recovery of heavy metals from solution. In one aspect, this invention relates to the recovery of heavy metals from aqueous solutions, especially dilute aqueous solutions.

BACKGROUND

High salinity geothermal brines typically contain up to several hundred parts per million of valuable heavy metals. Because of the large potential flow of geothermal brines from future power plants, metal recovery as a by-product of power production could be significant. Because the heavy metal concentrations are low, a simple and inexpensive process for recovery of heavy metals is desired. Those of skill in the art of course recognize that geothermal brines are just one example of the broad need for methods of heavy metal recovery. Indeed, the need to recover heavy metal ions from dilute aqueous solution is pervasive throughout industry.

Prior art procedures for recovery of heavy metals from solution include precipitation, cyanidization, amalgamation and electrolysis. Unfortunately, such procedures are not always capable of effectively recovering heavy metals from dilute solution, are expensive in terms of energy demand and are frequently quite time consuming.

OBJECTS OF THE INVENTION

An object of the invention, therefore, is a simple, rapid and inexpensive process for the recovery of heavy metal values from aqueous solutions containing heavy metals.

This and other objects will become apparent from further study of the disclosure and claims herein provided.

STATEMENT OF THE INVENTION

In accordance with the present invention, I have discovered that heavy metal values can be recovered from aqueous solutions thereof by precipitation of the heavy metal values with a water soluble polymer which has functional groups which interact with heavy metal ions. By the interaction of the polymer's functional groups and heavy metal ions, the effective molecular weight of the polymer is increased sufficiently to cause precipitation of the polymer heavy-metal complex. The precipitated complex can be collected and metal values recovered therefrom by suitable means. Suitable means for recovery of heavy metal values from the precipitated complex include, for example, calcination to remove polymer or displacement of metal from the polymer with an appropriate agent which binds to the polymer more tightly than does the heavy metal ion.

DETAILED DESCRIPTION OF THE INVENTION

The present invention provides a novel method for the recovery of heavy metals of atomic number 39-51, 57-84 and 89-117, inclusive, from aqueous solutions containing the same.

Thus, the present invention contemplates recovery of those metallic elements having atomic numbers between 36 and 118, excepting the alkali metals (Group IA) and the alkaline earth metals (Group IIA). Such metallic elements are yttrium, zirconium, niobium, molybdenum, technecium, ruthenium, rhodium, palladium, silver, cadmium, indium, tin, antimony, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, polonium, actinium, thorium, protactinium, uranium, neptunium, plutonium, americium, curium, berkelium, californium, einsteinium, fermium, mendelevium, nobelium, lawrencium, unnilquadium, unnilpentium, and unnilhexium, as well as the as yet undiscovered metals having atomic numbers 107-117. More commonly encountered heavy metals for which the present invention is particularly applicable include, for example, gold, silver, mercury, platinum, palladium, iridium, rhodium, osmium, ruthenium and uranium.

The process of the present invention involves contacting the aqueous solution from which the heavy metal values are to be recovered with a water soluble polymer which is substituted with functional groups that interact with the heavy metal ions as described in greater detail below.

The heavy metals which can be recovered in accordance with the present invention can be present in a variety of soluble forms, such as for example, the halide, amine halide, e.g., $Pt(NH_3)_4Cl_2$, cyanide, sulfate, hydrogen sulfate, sulfite, nitrate, phosphate, hydrogen phosphate, perhalates, arsenate, chromate, carboxylate, lactate, thiosulfate, and the like.

If precipitation does not occur readily upon addition of the water soluble polymer to the heavy metal containing aqueous solution, at least one polyvalent anion capable of converting the soluble heavy metal ion to a polydentate complex anion can be added. The resulting complex anion will more readily interact with the functional group of the polymer to cause precipitation of the heavy metal-polymer complex. Examples of polyvalent anions useful in the practice of the present invention include thiosulfate, sulfate, polysulfide, ferrocyanide, citrate, and the like.

Soluble polymers suitable for the practice of the present invention can be characterized by the formula:

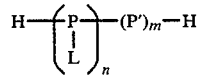

wherein P = 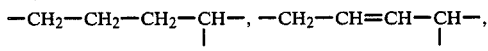

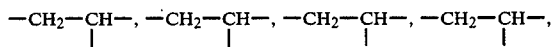

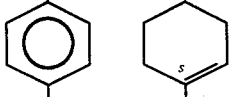 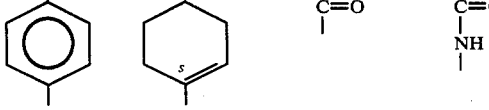

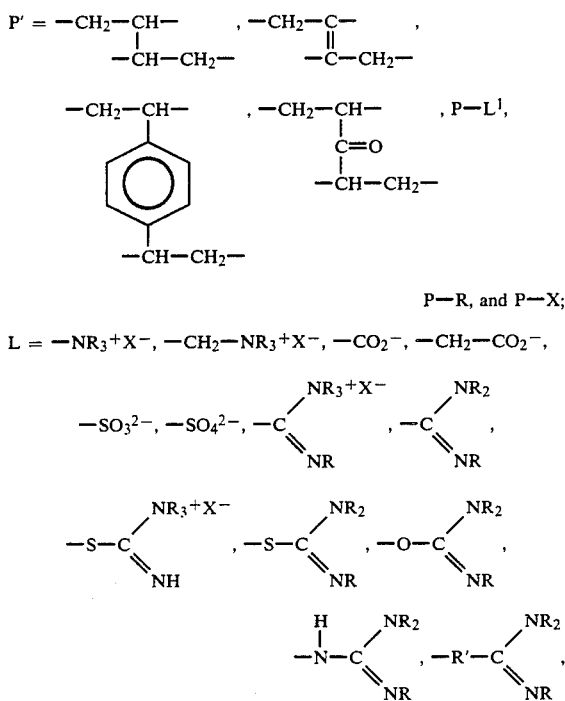

$L^1$ = any member of the group defined by L, with the proviso that for any given polymer $L \neq L^1$,
R = H or $C_1$–$C_8$ alkyl or aryl group; and
R' = $C_1$–$C_4$ alkyl group,
n = 2 up to $10^6$
m = 0 up to n, with the proviso that m is selected so that the resulting polymer is water soluble.

The ligands, L, which are suitable for use in the practice of the present invention are those which interact sufficiently strongly with the heavy metals targeted for recovery to cause precipitation of the polymer-metal complex. The scope of P-L and P' detailed above are such as to provide a water soluble polymer or copolymer. Typically, P-L is a hydrophilic group while P' can be either hydrophilic or hydrophobic. By introducing hydrophobicity (e.g., by branching or crosslinking) into the water soluble copolymer formulation well before additional crosslinking is introduced by the heavy metal-ligand interaction, the solubility of the polymer can be varied over a very wide range.

In a particular embodiment wherein the heavy metal to be recovered is present in aqueous solution in very low concentrations, and/or the desired heavy metal is of exceptionally high value, it is desirable to choose a copolymer which has low water solubility, i.e., the copolymer is almost water insoluble prior to contact with the heavy metals to be recovered under the conditions of usage.

Depending on the particular starting polymer employed, the heavy metals to be recovered, as well as the concentration of polymer and heavy metal, there may sometimes be substantial quantities of reacted but unprecipitated polymer left in the solution after the desired heavy metal has been removed from solution by precipitation and recovery of the precipitate. If desired, this soluble polymer can be recovered for reuse by carrying out a non-heavy metal precipitation and recovery of the resulting precipitate following the heavy metal precipitation and recovery of that first precipitate. Non-heavy metals are any metals other than those heavy metals with atomic number 39-51, 57-84, and 89-117. Non-heavy metals particularly useful for soluble polymer recovery include copper, nickle, cobalt, iron and the like. The polymeric portion of the polymer-non-heavy metal precipitate can be recovered by any suitable method as known to those of skill in the art, such as, for example the electrowinning the non-heavy metal from a slurry of the precipitate, by partitioning the non-heavy netal into an organic solvent solution of a liquid ion exchange agent, or by conventional aqueous-solid ionic exchange. Additional detail on crosslinking with non-heavy metals is presented in the Calculated Examples, below.

Since high concentrations of the desired heavy metal assures rapid kinetics in the aqueous-solid ion exchange system, the problem of selectivity limitations as are observed with low concentrations of metal values are avoided. In both the liquid-liquid and the liquid-solid ion exchange processes, it is readily recognized by those of skill in the art that it is important to select an ion exchange agent which does not interact with the soluble polymer originally employed to precipitate the metal values. For example, if the initial water soluble polymer employed was the sodium salt of a polyvinylsulfonic acid, then no solid ion exchange resin of the cationic type would be appropriate in the regeneration step because the water soluble polymer would chemisorb onto the solid substrate, as described in U.S. Pat. No. 4,511,677. Additional detail on crosslinking into conventional soild ion exchange resins is presented in the Calculated Examples, below.

Another method of recovering reacted, but unprecipitated polymer from aqueous solution would be to exploit the polymer-polymer interactions which are known to occur between certain complimentary water soluble polymers. For example, it is known that aqueous polyvinylbenzyltrimethylammonium chloride will react on contact with aqueous polyvinylsulfonic acid (sodium salt) to produce a precipitate. The two polymers are complimentary since one is anionic and the other is cationic, thus they mutually crosslink by forming ionic bonds. Other types of complimentarity as are well known to those of skill in the art can also be exploited, such as, for example, hemiacetal, acetal, hemiketal, ketal, ester, disulfide linkages and the like. Crosslinking through polymer-polymer interaction is particularly useful for heavy metal recovery when a first polymer is loaded with heavy metal but is not sufficiently loaded or crosslinked to produce a precipitate. By adding a complimentary second polymer to the loaded first polymer, sufficient crosslinking can be induced to permit precipitation and recovery of the metal values therefrom. Additional detail on crosslinking by polymer-polymer interaction is presented in the Calculated Example, below.

Ligands, L, which are suitable for the practice of the present invention are those which interact with the heavy metal ions to be recovered. Some of the heavy metal ions will interact with L, and produce modified polymer having relatively simple stoichiometry, such as, for example:

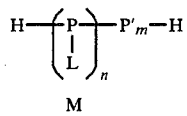

where M represents the heavy metal, or some complex form thereof to be recovered in accordance with the invention. Reaction of this type is accompanied by only a small increase in polymer molecular eight, and is referred to as the polymer loading mode. If the original polymer was only slightly water soluble, i.e., nearly insoluble, the small increase in polymer molecular weight may be sufficient to cause precipitation of the polymer. Some of the heavy metal-polymer interactions will be more complex, and consequently will cause a relatively larger increase in polymer molecular weight by interactions such as:

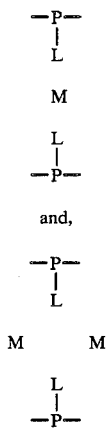

Those of skill in the art recognize that other metal-ligand interactions, as well-known in the art, are also possible.

Whereas in the first mode of heavy metal-polymer interaction, i.e., polymer loading mode, only a small increase in polymer molecular weight is obtained, in the latter mode of heavy metal-polymer interaction, i.e., where complex heavy metal-polymer interactions occur, referred to herein as the crosslinking modes, a large increase in polymer molecular weight occurs. When sufficient crosslinking occurs, such as for example, by the interactions illustrated above, the molecular weight of the polymer will be increased above the point where the polymer can be maintained in solution, and thus the polymer-metal complex precipitates. The above-described modes of heavy metal-polymer interaction are not mutually exclusive, so that it is commonly observed that both loading and crosslinking modes of interaction occur in the same solution.

When n and m are relatively small numbers, i.e., the original polymer is of low molecular weight, a great deal of crosslinking is required to cause precipitation of the polymer. Conversely, when n and m are relatively large numbers, i.e., the original polymer is of high molecular weight, significantly less crosslinking is required to cause polymer precipitation. Thus, the amount of polymer and the starting molecular weight of the polymer employed can be varied depending on the approximate concentration of the heavy metal desired to be recovered.

In accordance with the present invention, very high ratios of heavy metal to polymer are possible, e.g., 1-2 metal ions per monomer unit. These high loading levels can be achieved at concentrations as low as about fifty parts per million of heavy metal. At substantially lower heavy metal concentrations, the loading levels, i.e., the number of heavy metal ions per monomer unit, would be expected to be somewhat lower than the above-mentioned values. At still lower heavy metal concentrations, the degree of crosslinking caused by heavy metal-ligand interaction is sufficient to cause the partially loaded polymer to precipitate from solution. Heavy metal recovery can be achieved from such low concentration solutions by appropriate modifications to the polymer employed for heavy metal recovery. Thus, a starting polymer with ligands having greater affinity for the desired heavy metal can be employed. Alternatively, starting polymer with more branching, crosslinking, or of higher molecular weight can be employed to reduce the solubility of the initial polymer and, therefore, facilitate precipitation of the heavy metal loaded polymer. As yet another alternative, copolymer prepared with hydrophobic comonomer units will precipitate more rapidly, i.e., at lower heavy metal loadings. As a further alternative, polyvalent anions which are capable of converting the soluble heavy metal ions into bidentate complex ions which more readily interact with the functional groups on the polymer can be added to the heavy metal containing solution.

It is of course recognized by those of skill in the art that some heavy metal-polymer interactions are inherently limited to somewhat lower metal loadings per polymer functional group. For example, while a polymer comprising one hundred percent vinyl benzyltrimethylammonium chloride has a maximum loading with dilute gold (I) solution in the presence of thiosulfate anions of about two gold atoms per monomer unit, a fifty-fifty copolymer of styrene-vinyl benzyltrimethylammonium chloride would be inherently limited to a maximum loading of only about one gold atom per monomer unit.

Once the desired heavy metal values have been precipitated, the precipitate can conveniently be recovered by any suitable technique as known by those of skill in the art, such as for example, filtration, centrifugation, decantation of the liquid, or the like. The heavy metal values can then be recovered from the precipitate in a variety of ways, such as for example, calcination of the polymer-metal complex. In this way, the polymer is destroyed thereby leaving only the desired heavy metal behind. Alternatively, the polymer-metal complex can be treated with a regenerating agent which will displace the heavy metal from the polymer, producing an aqueous solution of unloaded, uncrosslinked polymer and a relatively concentrated solution of heavy metal species. The heavy metal can then be extracted from the concentrated solution by prior art techniques such as for example, electrowinning, and the regenerated polymer solution, absent the heavy metal values previously precipitated therewith, can be recycled to the beginning of the process for further treatment of additional heavy metal containing solution.

The heavy metal-polymer precipitates produced in accordance with the process of the present invention are novel compositions of matter which are useful, for example, as a source of valuable heavy metal species. The concentration of heavy metal species contained within the heavy metal-polymer precipitate is generally substantially greater than the concentration of heavy metal in the solution from which the heavy metal was precipitated. Thus, by subjecting the precipitate produced in accordance with the invention to the above-described metal recovery step, the polymer-heavy metal complex can be seen to be a valuable source of heavy metal values.

A further understanding of the present invention and its advantages will be provided by reference to the following nonlimiting examples.

EXAMPLE I

To a solution of gold (I) iodide containing about 1200 parts per million gold was added in excess of $Na_2S_2O_3$ ot complex the gold (I) as the $Au(S_2O_3)_2^{3-}$ complex anion. A similar excess amount of $Na_2S_2O_3$ was added to water containing no heavy metal ions and then twenty drops of an aqueous solution of poly(vinylbenzyltrimethylammonium chloride) containing about 33.5% solids were added. No precipitate formed from the gold-free solution, indicating that under these circumstances the bidentate thiosulfate anion does not sufficiently crosslink the polymer to cause precipitation. However, when twenty drops of the same polymer solution were added to the thiosulfate complexed gold solution, a thick white precipitate formed. This result indicates that the dilute $Au(S_2O_3)_2^{3-}$ anion solution is capable of crosslinking the polymer sufficiently to cause precipitation, bringing the gold ions out of solution as part of the precipitate.

EXAMPLE II

One gram of AuI and thirty grams of KI were dissolved in sufficient distilled water to obtain a gold concentration of 152 parts per million. To one half of this $AuI_2^{31}$ solution, 2.00 grams of poly(vinylbenzyltrimethylammonium chloride) solution containing 33.5% solids was added. A brown precipitate was formed and separated by centrifugation and decantation of the supernatant liquids. The supernatant gold content was found to be only 10.1 parts per million. The supernatant was also analyzed for organic carbon and was found to contain 51 parts per million organic carbon. Then 13.2 grams of $Na_2S_2O_3$ was added to one-half of the supernatant liquid. All of the added thiosulfate dissolved and no additional precipitate was formed.

To the other half of the $AuI_2^-$ solution prepared as described in the previous paragraph, 26.3 grams of $Na_2S_2O_3$ was added. No precipitate formed. To this, 2.00 grams of poly(vinylbenzyltrimethyl ammonium chloride), 33.5% solids in water, was added. A white precipitate formed and was separated from the supernatant liquid by centrifugation and decantation. The supernatant gold content was found to be 85.1 parts per million.

EXAMPLE III

A large quantity of $AuI_2^-$ solution containing 122 parts per million of gold was prepared with an excess of KI. Aliquots of this solution were weighed out and reacted with certain amounts of poly(vinylbenzyltrimethyl ammonium chloride) as summarized in Table I. Each resulting solution was examined for the presence of precipitate. If precipitate was present, the slurry was centrifuged and the supernatant was decanted and split into two portions. Additional polymer was added to one portion of the supernatant while additional gold solution was added to the other portion of the supernatant. If either portion revealed the formation of additional precipitate, the presence of unreacted gold or uncrosslinked polymer remaining in solution after the initial precipitation could thereby be determined.

TABLE I

| Moles of monomer in the polymer per mole of $KAuI_2$ | Results |
|---|---|
| 20 | No settling |
| 17 | No settling |
| 15 | No settling |
| 10 | Excess Polymer |
| 8 | Excess Polymer |
| 2 | Excess Polymer |
| 1.75 | Excess Gold |
| 1.25 | Excess Gold |

When the mole ratio of polymer monomer units to gold ions is greater than 10, insufficient crosslinking of the polymer occurs to cause polymer precipitation. In the range of about 2 to 10 moles polymer monomer units per gold ion, there is sufficient gold to cause crosslinking and precipitation of the polymer solution, but the results presented in Table I indicate that there is still an excess of polymer relative to the amount of gold available in solution. At and below about 1.75 moles of monomer per mole of gold, there is an excess of gold. Therefore the precise stoichiometry for complete reaction with no excess of either the gold or polymeric reagent lies somewhere between about 1.75 and 2 moles of polymer monomer unit per mole of gold ion. A sample of supernatant obtained from the test when the mole ratio was 2 was found to contain only about 4.73 parts per million of gold.

CALCULATED EXAMPLES

Recovery of Loaded, Soluble Polymer a. Further Crosslinking with Non-heavy Metal Ions It is known that aqueous poly(vinylbenzyltrimethylammonium chloride) with no gold present can be efficiently crosslinked and precipitated by addition of sodium ferrocyanide solution thereto. In Example II, a supernatant was produced by cationic polymer precipitation of gold, thereby reducing the gold content of the solution from 152 parts per million to 10.1 parts per million. Since this supernatant contains 51 parts per million of organic carbon as well as 10.1 parts per million of gold, it is believed to comprise gold-loaded cationic polymer which is insufficiently crosslinked to precipitate. It is reasonably expected that this loaded, but uncrosslinked polymer, could be precipitated by the addition of ferrocyanide to the solution. It is of course recognized, that the amount of ferrocyanide employed would need to be carefully controlled, because too little ferrocyanide would give insufficient crosslinking to cause additional precipitation whereas too much ferrocyanide would displace the gold originally complexed with the polymer.

b. Precipitation onto Conventional Solid Ion Exchange Resins

Alternatively, if the supernatant solution produced in Example II, containing 10.1 ppm of gold and 51 ppm of organic carbon, were passed through an ion exchange column packed with a strong acid type solid ion exchange resin the eluant would contain a greatly attenuated gold content. This gold content is very likely to be well below that to which the same strong acid ion exchange resin, such as poly(sodium vinyl sulfonate-co-divinyl benzene), could reduce a $AuI_2^-$ or $Au(S_2O_3)_2^{3-}$ solution containing either 152 parts per million or 10.1 parts per million of gold. Accordingly, the composition of matter produced by reacting dilute heavy metal ions with polymers are not only useful in concentrating the heavy metal directly by precipitation, but also, at yet greater dilution, heavy metal can be recovered by reaction with an appropriate conventional solid ion exchange resin.

c. Further Crosslinking using Polymer-Polymer Interactions

As yet another alternative, if the supernatant solution prepared as described in Example II, containing 10.1 ppm of gold and 51 ppm of organic carbon, were reacted with an appropriate amount, on the order of the amount required to add only about 1% additional organic carbon to the solution, (i.e., about 0.51 mg/l) of a concentrated (0.1 to 40% solids) aqueous solution poly(sodium vinylsulfonate), a precipitate would form bringing most of the gold out of solution. The precipitate could be separated by centrifugation, leaving behind a supernatant with very greatly reduced gold content. Accordingly, the compositions of matter produced by reacting the dilute heavy metal ion solutions with polymers are not only useful in concentrating the heavy metals directly by precipitation, but also, at much greater dilution, heavy metals can be recovered by reaction with an appropriate complimentary water soluble polymer.

The examples have been provided merely to illustrate the practice of my invention and should not be read so as to limit the scope of my invention or the appended claims in any way. Reasonable variations and modifications, not departing from the essence and spirit of my invention, are contemplated to be within the scope of patent protection desired and sought.

I claim:

1. A process for the recovery of heavy metals selected from the group consisting of elements with atomic numbers
39–51,
57–84, and
89–117 from aqueous solution which comprises
(a) contacting said solution with at least one soluble, cross-linkable polyelectrolyte having the structure:

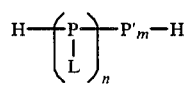

wherein P = $-CH_2-CH-$, $-CH_2-CH-$,
<br>                      |                 |
<br>                                       $CH_2$
<br>                                       |

$-CH_2-CH_2-CH_2-CH-$, $-CH_2-CH=CH-CH-$,
<br>                              |                              |

-continued

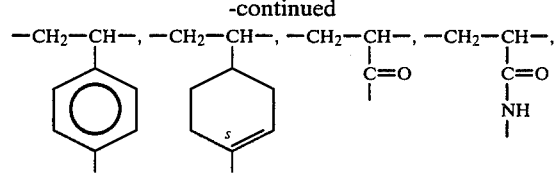

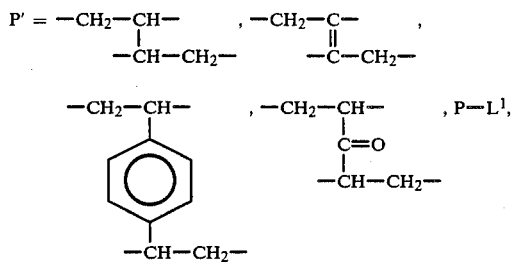

P—R, and P—X;

$L = -NR_3^+X^-, -CH_2-NR_3^+X^-, -CO_2^-, -CH_2-CO_2^-,$

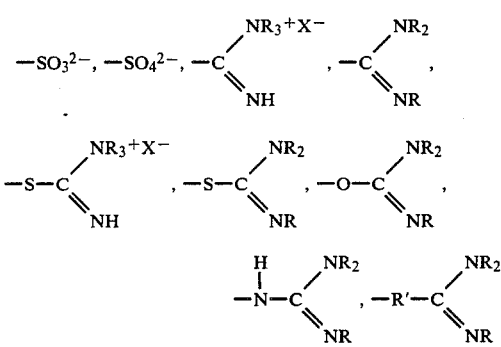

$X = Cl, Br$ or $I$;

$L^1$ = any member of the group defined by L, with the proviso that for any given polymer $L \neq L^1$,
R = H or $C_1-C_8$ alkyl or aryl group; and
R' = $C_1-C_4$ alkyl group,
n = 2 up to $10^6$, and
m = 0 up to n, with the proviso that m is selected so that the resulting polymer is water soluble, under conditions suitable to cause crosslinking and precipitation of said polyelectrolyte, and
(b) recovering the precipitate produced in step (a).

2. A process in accordance with claim 1 wherein said heavy metals are selected from the group consisting of:
gold,
silver,
platinum,
palladium,
iridium,
rhodium,
osminum,
ruthenium,
mercury, and
uranium.

3. A process in accordance with claim 1 wherein said heavy metals are present in solution as a compound of, or complex with at least one anion selected from the group consisting of:
- halide,
- perhalate
- cyanide,
- thiosulfate,
- sulfate,
- sulfite,
- hydrogen sulfate,
- nitrate,
- phosphate,
- hydrogen phosphate,
- arsenate, and
- chromate.

4. A process in accordance with claim 1 wherein said heavy metals in solution are treated, prior to step (a), with at least one polyvalent anion selected from the group consisting of:
- thiosulfate,
- sulfate,
- polysulfide,
- ferrocyanide, and
- citrate.

5. A process in accordance with claim 1 further comprising
- (c) calcining the precipitate recovered from step (b) to recover metal values therefrom.

6. A process in accordance with claim 1 further comprising:
- (c) treating said participate with at least one regenerant under conditions suitable to cause dissociation of the polyelectrolyte-heavy metal precipitate, and
- (d) recovering metal values from the solution produced by step (c) by electro deposition at a cathode.

7. A process in accordance with claim 6 further comprising:
- (c) recycling the solubilized polyelectrolyte produced in step (c) to step (a) after the completion of step (d).

8. A process for the recovery of heavy metals selected from the group consisting of elements with atomic numbers
- 39-51
- 57-84, and
- 89-117 from solution which comprises
- (a) contacting said solution with at least one soluble, cross-linkable polyelectrolyte under conditions suitable to cause loading of said polyelectrolyte with said heavy metals,
- (b) precipitating the heavy metal loaded polyelectrolyte produced in step (a), and
- (c) recovering the precipitate produced in step (b).

9. A process in accordance with claim 8 wherein step (b) comprises adding sufficient quantities of additional heavy metal or non-heavy metal to cause precipitation.

10. A process in accordance with claim 8 wherein step (b) comprises adding sufficient quantities of a solid ion exchange resin to said heavy metal loaded polyelectrolyte to cause precipitation.

11. A process in accordance with claim 8 wherein step (b) comprises adding sufficient quantities of a second polyelectrolyte to cause precipitation of said heavy metal loaded polyelectrolyte, wherein said second polyelectrolyte is complimentary to said heavy metal loaded polyelectrolyte.

12. The composition produced in accordance with claim 1.

* * * * *